(12) United States Patent  (10) Patent No.: US 7,225,725 B2
Trestain  (45) Date of Patent: Jun. 5, 2007

(54) BI-DIRECTIONAL PNEUMATIC MOTOR

(76) Inventor: Dennis A. Trestain, 1306 Jack Henry Dr., Charlotte, MI (US) 48813

( * ) Notice: Subject to any disclaimer, the term of this patent is extended or adjusted under 35 U.S.C. 154(b) by 0 days.

(21) Appl. No.: 11/130,474

(22) Filed: May 17, 2005

(65) Prior Publication Data

US 2006/0260465 A1  Nov. 23, 2006

(51) Int. Cl.
*F01B 31/10* (2006.01)
*F01L 25/02* (2006.01)
(52) U.S. Cl. .................. 92/165 R; 92/155; 91/219; 91/319
(58) Field of Classification Search .............. 91/165, 91/219, 237, 317, 318, 319, 321; 92/165 R, 92/155, 169.4
See application file for complete search history.

(56) References Cited

U.S. PATENT DOCUMENTS

| 1,054,754 | A | * | 3/1913 | Dawley ................... 91/239 |
| 1,574,762 | A | * | 3/1926 | Smith et al. .............. 91/239 |
| 2,214,755 | A | * | 9/1940 | Tafel ....................... 60/537 |
| 2,223,792 | A | * | 12/1940 | Muir ....................... 91/318 |
| 2,289,942 | A | | 7/1942 | Tafel |
| 2,482,534 | A | * | 9/1949 | Antonidis .................. 74/7 A |
| 2,861,548 | A | | 11/1958 | Burgess, Jr. et al. |
| 3,704,651 | A | | 12/1972 | Kupka |
| 4,870,891 | A | * | 10/1989 | Shew et al. ................ 91/319 |
| 5,070,769 | A | | 12/1991 | Fehr |
| 5,313,875 | A | * | 5/1994 | Kadlicko ................. 92/165 R |
| 5,402,878 | A | | 4/1995 | Lutz |
| 5,413,031 | A | * | 5/1995 | Kohlmeyer .............. 92/165 R |
| 5,996,773 | A | | 12/1999 | Gist |
| 6,026,949 | A | | 2/2000 | Foster |
| 6,505,659 | B1 | * | 1/2003 | Hummel .................. 144/135.2 |
| 6,694,858 | B2 | * | 2/2004 | Grimes ..................... 91/317 |
| 6,712,511 | B2 | * | 3/2004 | Matsui et al. .............. 384/45 |
| 7,040,465 | B2 | * | 5/2006 | Jones et al. ............. 188/196 V |

\* cited by examiner

*Primary Examiner*—Michael Leslie
(74) *Attorney, Agent, or Firm*—Mary M. Moyne; Fraser Trebilcock Davis & Dunlap, P.C.

(57) ABSTRACT

A pneumatic motor for providing bi-directional linear motion including a motor housing having a cylinder bore and a piston mounted on a piston rod positioned in the cylinder bore. The ends of the piston rod extend beyond the ends of the cylinder bore. The cylinder bore has a liner which acts to provide lubrication for movement of the piston in the cylinder bore and to provide a seal between the piston and the cylinder bore. The motor can be used to provide the drive means for a linear motion conveyor.

25 Claims, 9 Drawing Sheets

BI-DIRECTIONAL PNEUMATIC MOTOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION (1) Field of the Invention

The present invention relates to a pneumatic motor for providing linear movement. In particular, the present invention relates to a pneumatic motor for use in a linear motion conveyor. Linear motion conveyors, also known as differential impulse conveyors, move objects along a surface or tray by varying the direction and speed of the movement of the surface. The conveyor motor moves the conveyor surface slowly in a forward direction to convey the objects forward. The conveyor motor then moves the conveyor surface quickly in the opposite or backward direction. As the conveyor surface is quickly moved backwards, the objects slide along the conveyor surface such that the objects remain in the forward position. The slow forward and fast rearward motion is repeated to move the objects along the surface in the forward direction.

(2) Description of the Related Art

The related art has shown various piston systems for use in conveyors. Illustrative are U.S. Pat. Nos. 2,214,755 and 2,289,942 to Tafel; U.S. Pat. No. 5,402,878 to Lutz; U.S. Pat. No. 5,996,773 to Gist; and U.S. Pat. No. 6,026,949 to Foster.

The Tafel patents disclose a reciprocating conveyor where one (1) end of a piston is used to move the conveyor. The piston is driven by a hydraulic drive unit. The hydraulic drive unit is actuated by a motor. The actuating fluid for the hydraulic unit and piston is preferably oil. The reciprocating movement of the piston is controlled by the hydraulic drive unit.

Gist describes a fluid drive system for use to operate a reciprocating floor. The fluid drive includes an array of hydraulic motors where a piston is driven reciprocally within a cylinder by selective application of fluid under pressure to one (1) side or the other of the piston. Only one (1) end of the piston is used to move the floor.

Lutz and Foster describe a reciprocating slat conveyor having hydraulic drivers.

Only of minimal interest are U.S. Pat. No. 2,861,548 to Burgess, Jr., et al.; U.S. Pat. No. 3,704,651 to Kupka and U.S. Pat. No. 5,070,769 to Fehr.

Burgess, Jr., et al. describes a vibrator for use in a vibration conveyor which uses a reciprocating piston driven by fluid pressure such as compressed air.

Kupka describes a free piston vibratory power source for use in underwater applications which uses compressible fluids, such as compressed air or steam.

Fehr describes a pneumatic linear vibrator which uses a compressed air piston.

There remains a need for a simple and durable pneumatic engine which uses a piston moved by compressed air where the ends of the piston rod are used to provide the linear movement such as to move a reciprocating conveyor.

SUMMARY OF THE INVENTION

A pneumatic motor for providing bi-directional linear motion. The pneumatic motor includes a motor housing having a cylinder bore and a piston mounted on a piston rod positioned in the cylinder bore. The piston rod has a length between the ends greater than the length of the cylinder bore so that the ends of the piston rod extend beyond the ends of the cylinder bore. The ends of the cylinder bore have end plates with openings through which the piston rod extends. The end plates position and guide the piston rod in the cylinder bore. The openings of the end plates have bushings to allow for easier movement of the piston rod in the cylinder bore. The piston is rotatably mounted on the piston rod and is prevented from moving along a length of the piston rod by retainers. The circumference of the outer surface of the piston can be provided with seals or o-rings to provide a seal between the piston and the cylinder bore. The cylinder bore can be provided with a liner which acts to provide lubrication for movement of the piston in the cylinder bore and to provide a seal between the piston and the cylinder bore. In one (1) embodiment, the liner is an oil impregnated liner which releases oil during use.

The cylinder bore has a first air port adjacent the first end and a second air port adjacent the second end. The air ports allow for moving air into the cylinder bore adjacent the first or second end of the cylinder bore. The air ports are connected to a pneumatic switch or valve to control the flow of air into the cylinder bore to control the direction of movement and the rate of movement of the piston and piston rod in the cylinder bore. Switch openings are provided in the cylinder bore which allow for automatic switching of the pneumatic switch to control air flow to the cylinder bore in response to movement of the piston in the cylinder bore. Air is moved into the cylinder bore adjacent the first end of the piston to move the piston in the second direction. When the piston has moved a predetermined distance in the cylinder bore in the second direction, the piston moves past one of the switch openings which sends a signal to the pneumatic switch to stop the flow of air to the cylinder bore adjacent the first end of the piston and to start the flow of air to the cylinder bore adjacent the second end of the piston to move the piston in the first direction. When the piston has moved a predetermined distance in the cylinder bore in the first direction, the piston moves past the other switch opening which sends a signal to the pneumatic to stop the flow of air to the cylinder bore adjacent the second end of the piston and start the flow of air to the cylinder bore adjacent the first end of the piston to move the piston in the second direction.

The bi-directional pneumatic motor can be used to provide the drive means for a linear motion conveyor. The motor is mounted within the housing of the conveyor and is connected to the movable conveyor plate. The ends of the piston rod are in contact with the conveyor plate. When the piston rod moves, the ends of the piston rod push against blocks attached to the conveyor plate to move the conveyor plate. The ends of the piston rod are provided with swivel feet which are adjustable. The swivel feet contact the blocks and allow for slight variations between the positions of the blocks and the piston rod. Guide shafts can also be provided to assist in guiding and stabilizing the movement of the conveyor plate. The guide shafts extend through the motor housing essentially parallel to the cylinder bore and are attached at each end to the blocks of the conveyor. When the pneumatic motor is used as a drive force for a linear motion conveyor, a controller is provided in the air flow system to control the rate of flow of air to the cylinder bore to control the rate of movement of the piston and the conveyor plate. In a linear motion conveyor, the controller acts to control the flow of air so that a rate of movement of the piston and the conveyor plate in the first direction is greater than a rate of movement of the piston and the conveyor plate in a second direction. The controller can also be used to delay the switch of air flow so that there is a pause in the movement of the conveyor plate as the direction of movement of the conveyor plate switches from the first direction to the second direction.

The present invention relates to a pneumatic motor for use in a conveyor for moving objects on a conveyor plate, the motor which comprises: a housing; a cylinder bore having opposed ends and located in the housing; a piston rod having opposed ends and movably mounted in the cylinder bore so that the ends of the piston rod extend out of the ends of the cylinder bore wherein the ends of the piston rod are connected to the conveyor plate; and a piston having opposed ends and mounted on the piston rod in the cylinder bore spaced between the ends of the piston rod and the ends of the cylinder bore, wherein air flows into the cylinder bore adjacent one end of the piston to move the piston, the piston rod and the conveyor plate in a first direction and wherein when the piston moves a predetermined distance in the cylinder bore, air flows into the cylinder bore adjacent the other end of the piston to move the piston, piston rod and conveyor plate in a second direction opposite to the first direction wherein a rate of movement of the piston in the first direction is greater than a rate of movement of the piston in the second direction.

Further, the present invention relates to a pneumatic motor for providing linear motion in opposed directions, which comprises: a cylinder bore having opposed ends with a liner spaced between the ends wherein the liner is oil impregnated; a piston rod having opposed ends and extending through the cylinder bore, the piston rod having a length between the ends greater than a length of the cylinder bore between the ends so that the piston rod extends outward beyond each end of the cylinder bore; and a piston having a first end and a second end and mounted on the piston rod in the cylinder bore adjacent the liner wherein air is moved into the cylinder bore adjacent the first end of the piston and moves the piston in a second direction, wherein when the piston has moved a predetermined distance in the cylinder bore, air is moved into the cylinder bore adjacent the second end of the piston to move the piston in a first direction opposite the second direction.

Still further, the present invention relates to a conveyor for moving objects on a conveyor plate, which comprises: a fluid actuated motor which includes a housing having a cylinder bore with opposed ends forming a longitudinal axis of the cylinder bore, a piston rod having opposed ends and movably mounted in the cylinder bore wherein each of the ends of the piston rod extends beyond the ends of the cylinder bore and is connected to the conveyor plate, and a piston having opposed ends and mounted on the piston rod between the ends of the piston rod in the cylinder bore wherein fluid enters the cylinder bore adjacent one end of the piston to move the piston, piston rod and conveyor plate in a first direction and wherein when the piston reaches a predetermined position in the cylinder bore, fluid enters the cylinder bore adjacent the other end of the piston to move the piston, piston rod and conveyor plate in a second direction opposite from the first direction and wherein a rate of movement of the conveyor plate in the first direction is greater than a rate of movement of the conveyor plate in the second direction.

The substance and advantages of the present invention will become increasingly apparent by reference to the following drawings and the description.

BRIEF DESCRIPTION OF THE PREFERRED EMBODIMENTS

Figure 3:
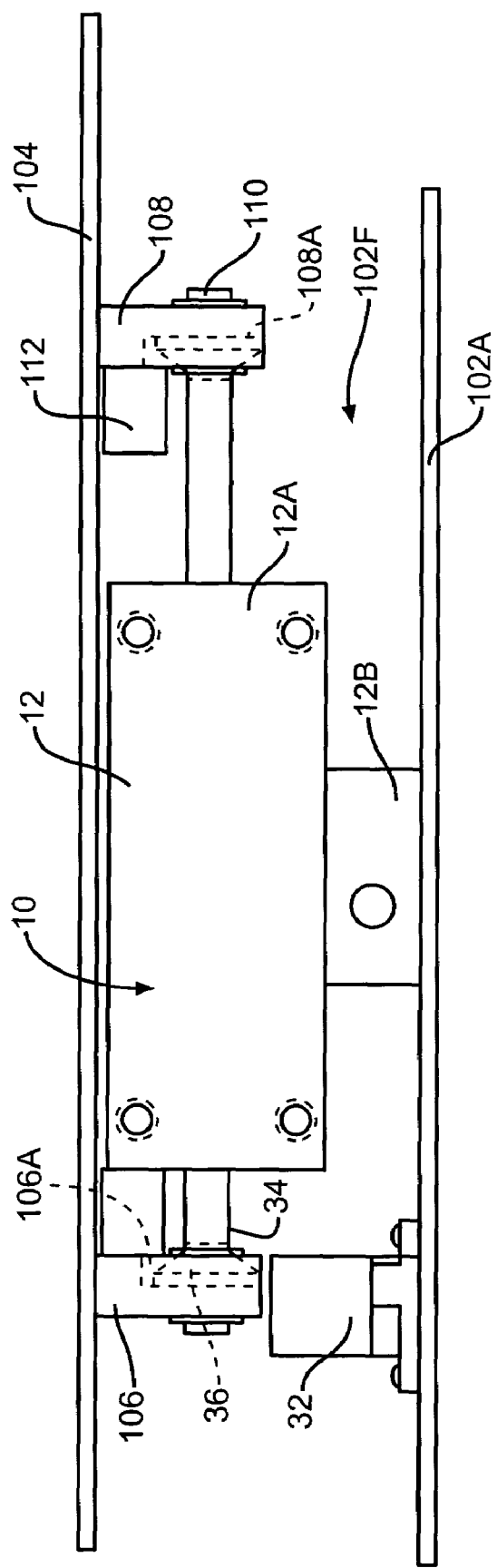
FIG. 3 is a side view of the conveyor 100 without the end walls 102B and 102C and the side walls 102D and 102E of the conveyor housing 102.

The pneumatic, bi-directional motor 10 of the present invention includes a motor housing 12 having a cylinder bore 14 with a piston rod 34 and a piston 38 positioned in the cylinder bore 14. In one (1) embodiment, the motor housing 12 has a first section 12A and a second section 12B. The second section 12B is spaced below the first section 12A (FIG. 3).

Figure 5:
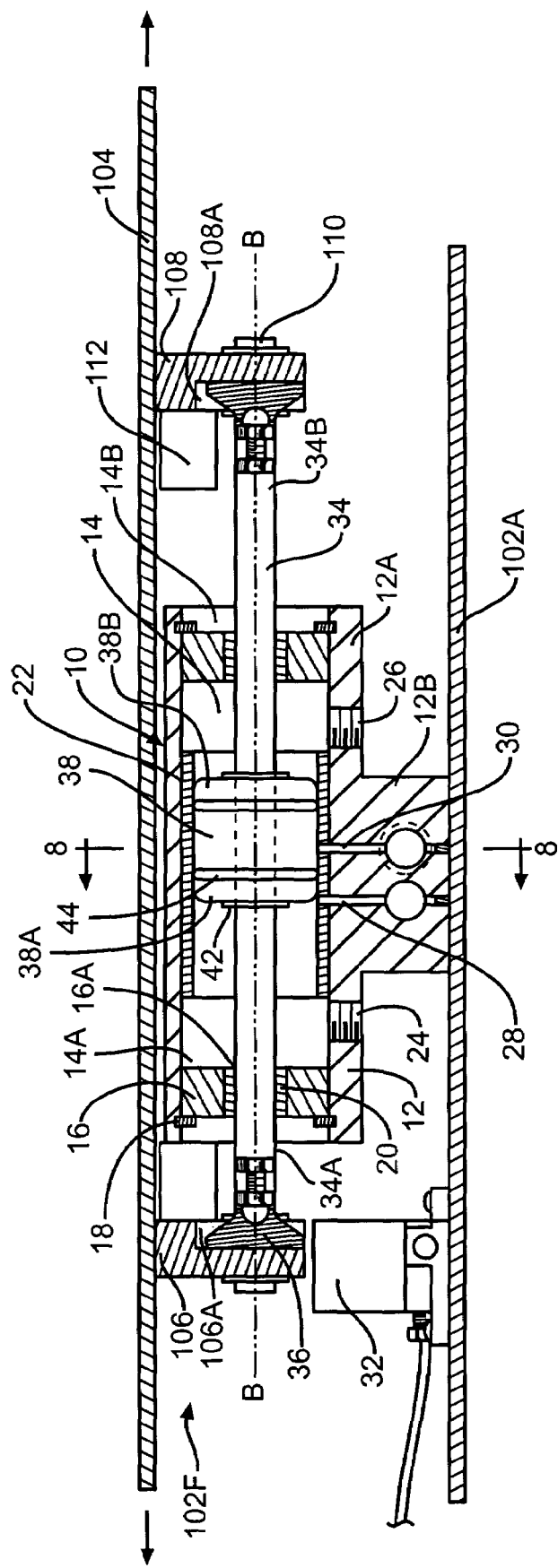
FIG. 5 is a cross-sectional view of FIG. 2 along the line 5—5 showing the piston 38, the piston rod 34 and the cylinder bore 14 of the pneumatic motor 10 of the present invention.

The cylinder bore 14 is located in the first section 12A of the motor housing 12. The cylinder bore 14 extends completely through the motor housing 12 having open first and second ends 14A and 14B forming the axis B—B of the cylinder bore 14 (FIG. 5). In one (1) embodiment, the cylinder bore 14 is metallic. In one (1) embodiment, removable end plates 16 are mounted in the open ends 14A and 14B of the cylinder bore 14. In one (1) embodiment, the end plates 16 are secured in the cylinder bore 14 by locking rings 18. The end plates 16 have openings 16A which extend into the cylinder bore 14. The openings 16A are aligned with the axis B—B of the cylinder bore 14 and allow for mounting the piston rod 34 through the cylinder bore 14. In one (1) embodiment, the openings 16A are provided with oil impregnated bushings 20 which are self-lubricating. The bushings 20 allow for easier movement of the piston rod 34 in the cylinder bore 14. The bushings 20 also seal the piston rod 34 in the end plates 16 and prevent air from escaping from the cylinder bore 14 between the openings 16A in the end plates 16 and the piston rod 34. In one (1) embodiment, the bushings 20 are bronze. In one (1) embodiment, the bushings 20 are press fit into the openings 16A in the end plates 16.

A liner 22 is provided in the cylinder bore 14. In one (1) embodiment, the liner 22 has a cylindrical shape and extends around the entire inner circumference of the cylinder bore 14. The liner 22 has an outer circumference slightly smaller than the inner circumference of the cylindrical bore 14 so that the liner 22 is press fit into the cylinder bore 14. In one (1) embodiment, the liner 22 is removable from the cylinder bore 14 to allow replacement of the liner 22. In one (1) embodiment, the liner 22 extends along only a portion of the length of the cylinder bore 14 between the ends 14A and 14B. In one (1) embodiment, the liner 22 only extends the length of the cylinder bore 14 traveled by the piston 38. In one (1) embodiment, the liner 22 is spaced an equal distance from each end of the cylinder bore 14. In one (1) embodiment, the liner 22 is oil impregnated. In one (1) embodiment, the liner 22 is circumference constructed of oil impregnated bronze similar to the oil lite bronze bushing distributed by McMaster-Carr Company.

Figure 10:
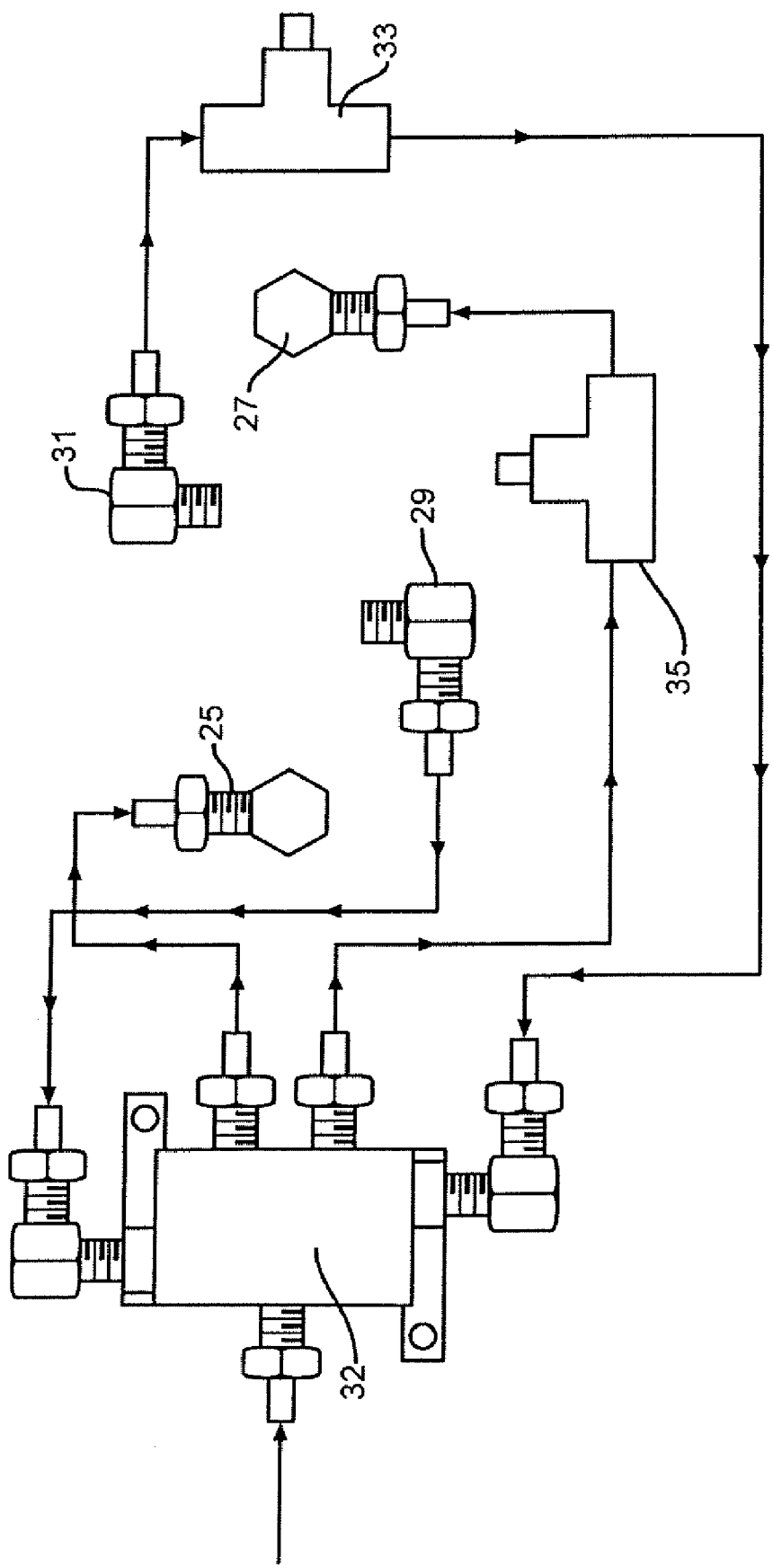
FIG. 10 is a schematic representation of the air flow system of the pneumatic motor 10.

First and second air ports 24 and 26 are provided in the cylinder bore 14. The first air port 24 provides a passageway through the first section 12A of the motor housing 12 into the cylinder bore 14 adjacent the first end 14A of the cylinder bore 14. The second air port 26 provides a passageway through the first section 12A of the motor housing 12 into the cylinder bore 14 adjacent the second end 14B of the cylinder bore 14. In the embodiment where the liner 22 does not extend the complete length of the cylinder bore 14, the first and second air ports 24 and 26 are spaced between the liner 22 and the first and second end plates 16, respectively, adjacent the first and second ends 14A and 14B of the cylinder bore 14. Air fittings 25 and 27 are mounted in the first and second air ports 24 and 26 and are connected by air lines to a pneumatic switch 32 (FIG. 10).

The cylinder bore 14 also has first and second switch openings 28 and 30 which are connected to passageways which extend through the first and second sections 12A and 12B of the motor housing 12 (FIG. 5). In one (1) embodiment, the switch openings 28 and 30 extend through the liner 22 and are located adjacent the center of the cylindrical bore 14 spaced between the ends 14A and 14B. In one (1) embodiment, the switch openings 28 and 30 are equally spaced apart from the center of the cylinder bore 14. Air fittings 29 and 31 are mounted in the passageways for the switch openings 28 and 30 and are connected by air lines to the pneumatic switch 32. The pneumatic switch or valve 32 is connected to the air supply (not shown). The air supply can be any well known source. In one (1) embodiment, the air is compressed air. The pneumatic switch or valve 32 controls the flow of air to the first and second air ports 24 and 26. In one (1) embodiment, a supply manifold is provided separate from the pneumatic switch 32. In one (1) embodiment, a controller 33 is provided in one of the air lines from the first or second switch openings 28 and 30 to the pneumatic switch 32. The controller 33 regulates the rate of flow of air to the pneumatic switch 32 which controls the rate of switching from one direction of movement to the other direction of movement of the piston 38. In one (1) embodiment, a controller 35 is provided in one of the air lines from the pneumatic switch 32 to one of the air ports 24 or 26. The controller 35 regulates the rate of flow of air to the cylinder bore 14 which controls the rate of movement of the piston 38 in the cylinder bore 14.

The piston rod 34 or push rod has opposed first and second ends 34A and 34B and is movably mounted in the cylinder bore 14. The length of the piston rod 34 between the ends 34A and 34B is greater than the length of the cylinder bore 14 between the ends 14A and 14B so that the piston rod 34 extends completely through the cylinder bore 14 and the first and second ends 34A and 34B of the piston rod 34 extend through the openings 16A in the end plates 16 beyond the first and second ends 14A and 14B, respectively, of the cylinder bore 14. The piston rod 34 is positioned so as to extend through the center of the cylinder bore 14.

Figure 9:
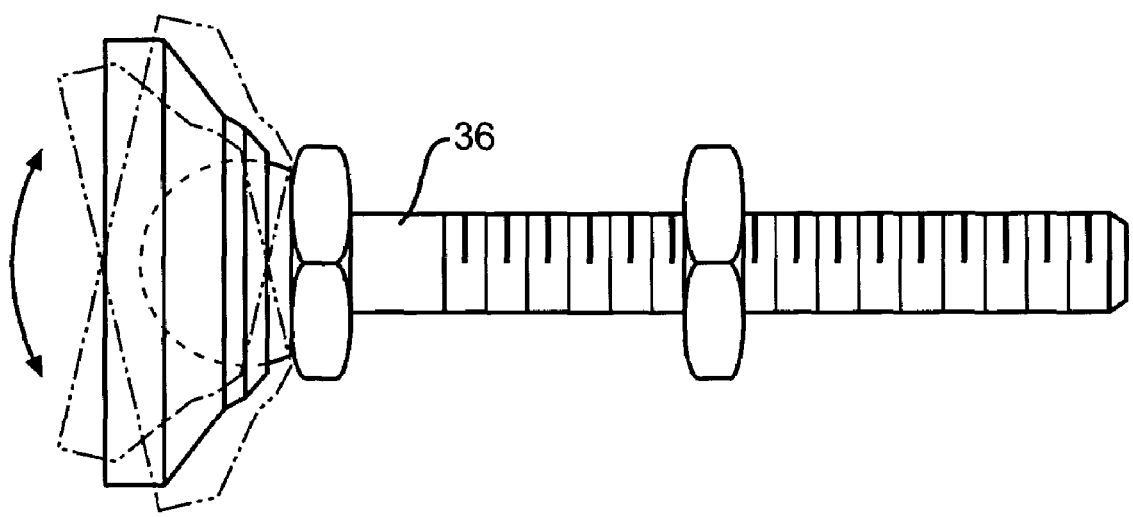
FIG. 9 is a side view of one of the swivel feet 36 showing the various positions of the foot.

Swivel feet 36 are mounted on the ends 34A and 34B of the piston rod 34. The swivel feet 36 include a ball and socket joint which allow the foot to flex in various directions (FIG. 9).

Figure 7:
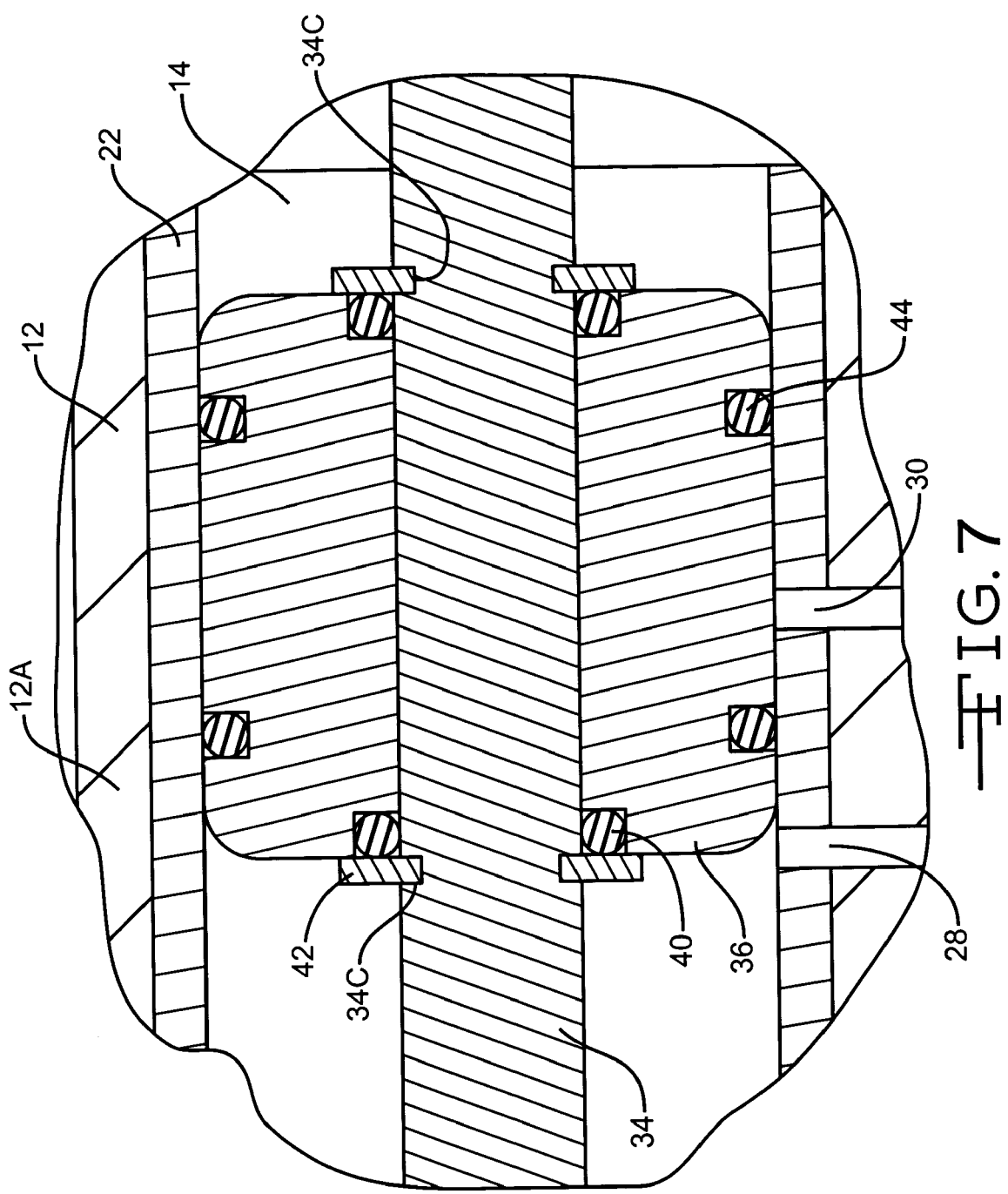
FIG. 7 is a partial cross-sectional view of the piston 38 mounted on the piston rod 34 and positioned in the cylinder bore 14.
Figure 8:
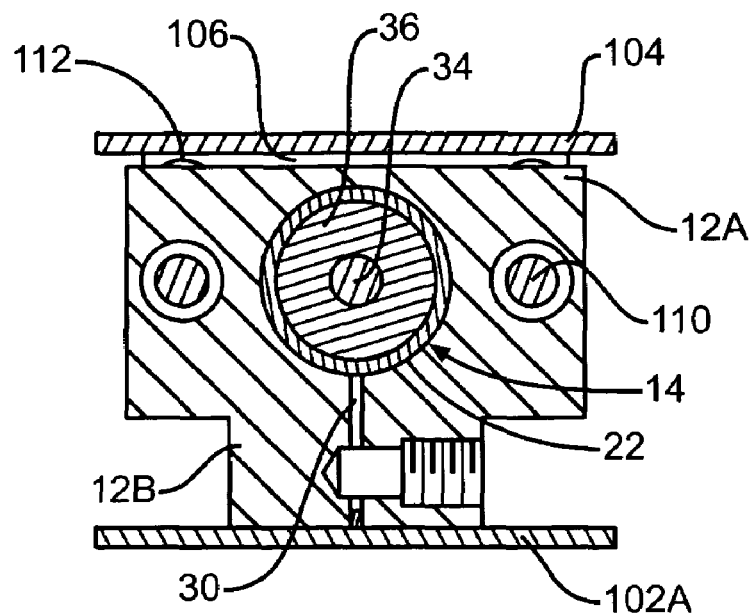
FIG. 8 is a cross-sectional view of FIG. 5 along the line 8—8 showing the second switch opening 30 for the pneumatic switch 32.

The piston 38 is mounted on the piston rod 34 spaced between the ends 34A and 34B of the piston rod 34. In one (1) embodiment, the piston 38 is spaced an equal distance from each end 34A and 34B of the piston rod 34. The piston 38 has an essentially cylindrical shape with a first end 38A and a second end 38B and a center bore 38C extending therebetween. The center bore 38C of the piston 38 has a diameter slightly greater than the diameter of the piston rod 34 so that when the piston 38 is mounted on the piston rod 34, the piston 38 is able to rotate on the piston rod 34. In one (1) embodiment, o-rings or seals 40 are provided adjacent the center bore 38C of the piston 38 in each end 38A or 38B of the piston 38. In this embodiment, the ends 38A and 38B of the piston 38 have indentions 38D around the center bore 38C and the o-rings 40 are mounted in the indentions 38D in the ends 38A and 38B of the piston 38 (FIG. 7). The o-rings 40 prevent air from moving through the piston 38 between the center bore 38C of the piston 38 and the piston rod 34. In one (1) embodiment, the piston rod 34 has spaced apart grooves 34C and the piston 38 is positioned on the piston rod 34 between the grooves 34C. Retainers 42 such as snap-rings are secured in the grooves 34C to fix the piston 38 in place on the piston rod 34. In this embodiment, the piston 38 is able to rotate on the piston rod 34 but can not move along the length of the piston rod 34. In one (1) embodiment, the outer circumference of the piston 38 is slightly smaller than the circumference of the cylinder bore 14 with the liner 22. In one (1) embodiment, the outer surface of the piston 38 has grooves 38E. Seals 44 such as o-rings are positioned about the circumference of the outer surface in the grooves 38E. The seals 44 provide a seal between the piston 38 and the cylinder bore 14 or the liner 22 and prevent air from moving past the piston 38 between the outer surface of the piston 38 and the liner 22 or cylinder bore 14. In one (1) embodiment, the outer surface of the piston 38 does not have seals 44. In one (1) embodiment, the piston 38 is constructed of steel.

In use, air is supplied from an air supply through the pneumatic switch 32 through the air line to the first air port 24. Air moves through the first air port 24 into the cylinder bore 14 adjacent the first end 38A of the piston 38. As air is moved into the cylinder bore 14, the pressure or force of the air pushes against the first end 38A of the piston 38 and moves the piston 38 in the second direction toward the second end 14B of the cylinder bore 14. In one (1) embodiment, the oil impregnated liner 22 provides a seal between the outer surface of the piston 38 and the cylinder bore 14. This seal prevents air adjacent the first end 14A of the cylinder bore 14 and the first end 38A of the piston 38 from escaping around the outer surface of the piston 38, between the piston 38 and the cylinder bore 14 or liner 22. The oil impregnated liner 22 is self-lubricating. The oil released from the liner 22 also acts as a lubricator and reduces the friction between the piston 38 and the liner 22 to enable easier movement of the piston 38 in the cylinder bore 14 and to reduce wear on the piston 38 and liner 22. In one (1) embodiment where the piston 38 has seals 44 on the outer surface, the seals 44 provide the seal between the piston 38 and the liner 22 or the cylinder bore 14 and prevent air from escaping between the piston 38 and the liner 22 or the cylinder bore 14.

As the piston 38 moves in the cylinder bore 14, air adjacent the second end 14B of the cylinder bore 14 is pushed out of the cylinder bore 14 through the second air port 26. It is understood that a separate exhaust could be used to move the air out of the cylinder bore 14. When the piston 38 has moved the predetermined distance in the cylinder bore 14, the piston 38 moves past the first switch opening 28 in the liner 22 and the cylinder bore 14. When the piston 38 passes the first switch opening 28, the first switch opening 28 is in fluid communication with the air adjacent the first end 14A of the cylinder bore 14. The change in pressure at the first switch opening 28 sends a signal through the attached air line to activate the pneumatic switch 32 connected to the first switch opening 28. When the pneumatic switch 32 is activated, the pneumatic switch 32 stops the flow of air to the first air port 24. Simultaneously, the pneumatic switch 32 starts the flow of air to the second air port 26. The switching of the flow of air from the first air port 24 to the second air port 26 acts to change the direction of movement of the piston 38 from the second direction to the opposite first direction. As air flows through the second air port 26 into the cylinder bore 14 adjacent the second end 38B of the piston 38, the piston 38 moves in the first direction toward the first end 14A of the cylinder bore 14. As the piston 38 moves in the first direction, air adjacent the first end 14A of the cylinder bore 14 is forced out of the cylinder bore 14 through the first air port 24. It is understood that a separate exhaust could be used to move the air out of the cylinder bore 14. When the piston 38 has moved the predetermined distance in the first direction, the piston 38 moves past or beyond the second switch opening 30. When the piston 38 moves past the second switch opening 30, the second switch opening 30 is exposed to the air adjacent the second end 14B of the cylinder bore 14 which changes the pressure at the second switch opening 30 and sends a signal to the pneumatic switch 32 to activate and stop the flow of air to the second air port 26 and start the flow of air to the first air port 24. The use of a pneumatic switch 32 connected to switch openings 28 and 30 in the cylinder bore 14 allows for automatic switching of the direction of movement of the piston 38 based on the movement of the piston 38. It is understood that other types of switches can be used to control the flow of air to the cylinder bore 14 and thus control the direction and rate of movement or speed of the piston 38.

Figure 1:
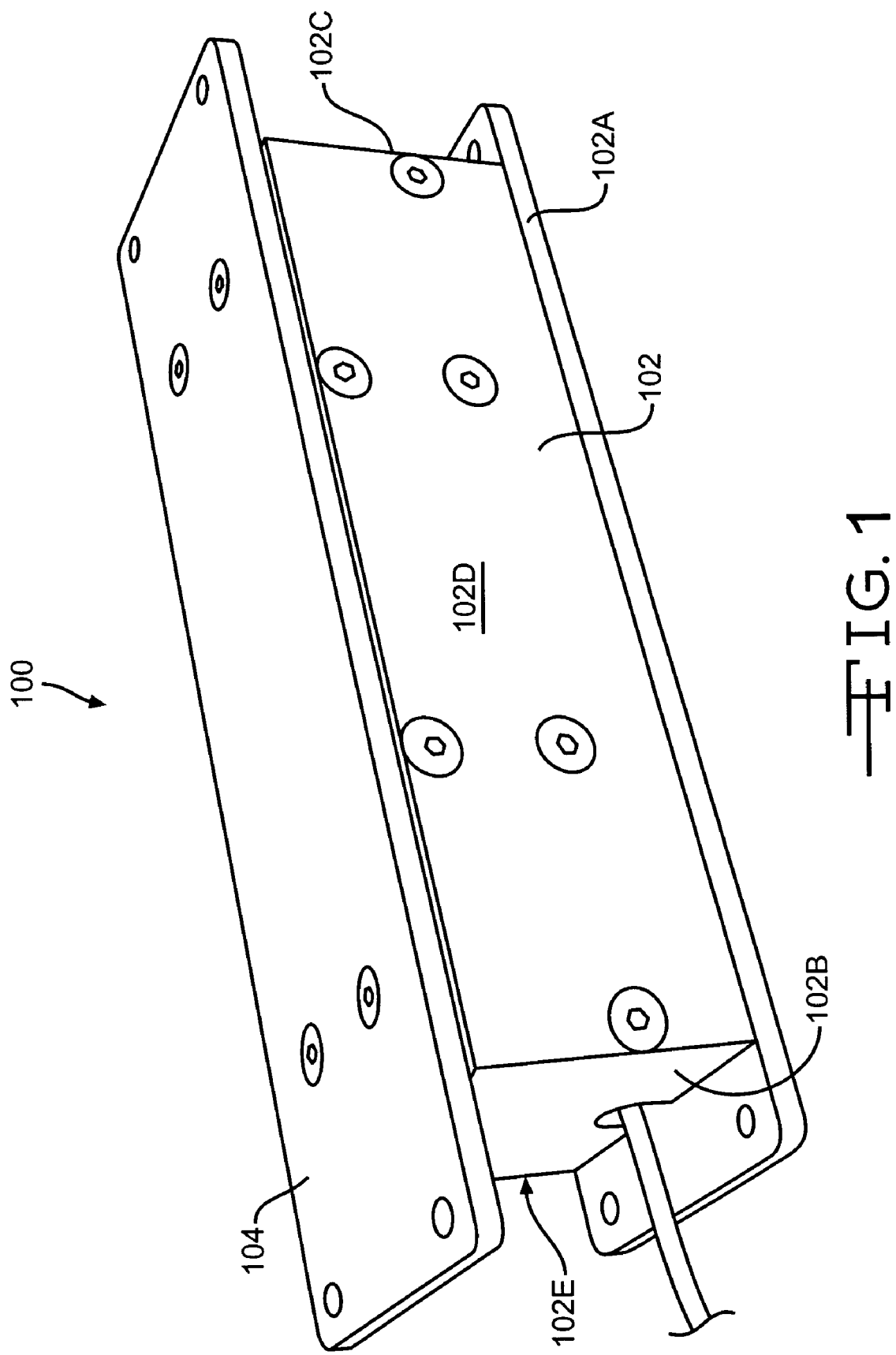
FIG. 1 is a perspective view of the linear conveyor 100 of the present invention.
Figure 2:
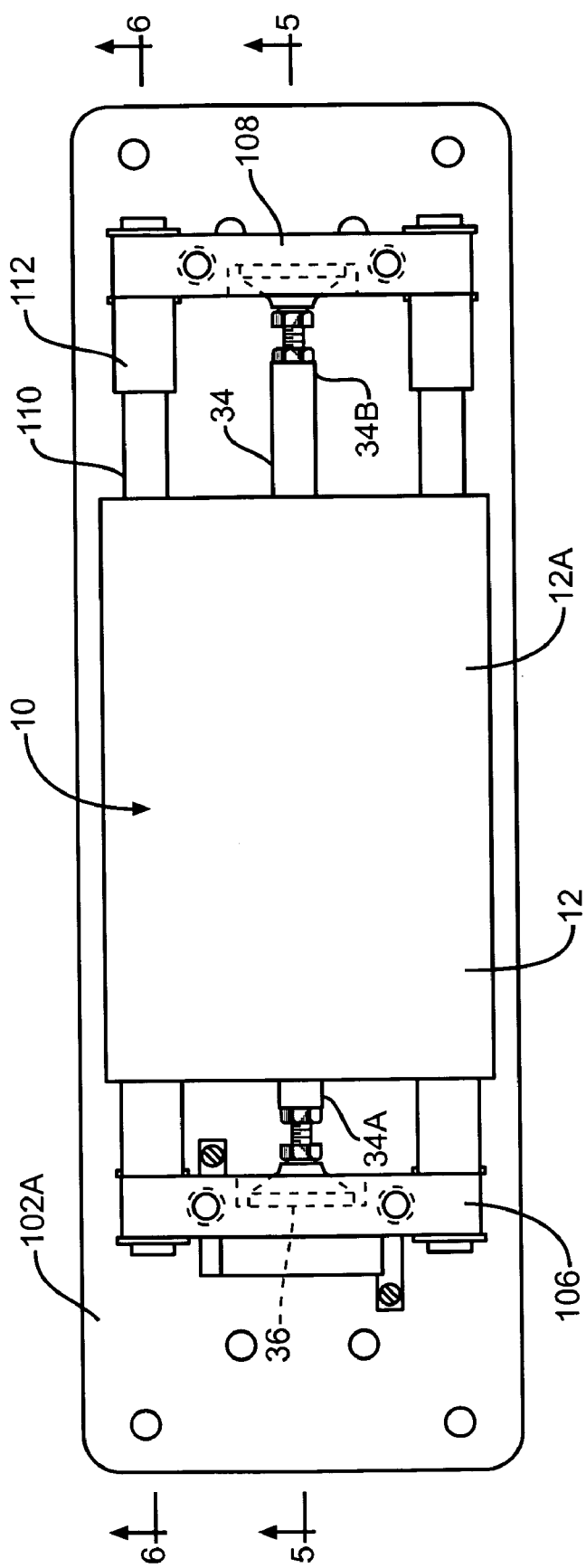
FIG. 2 is a top view of the linear conveyor 100 without the conveyor plate 104.
Figure 4:
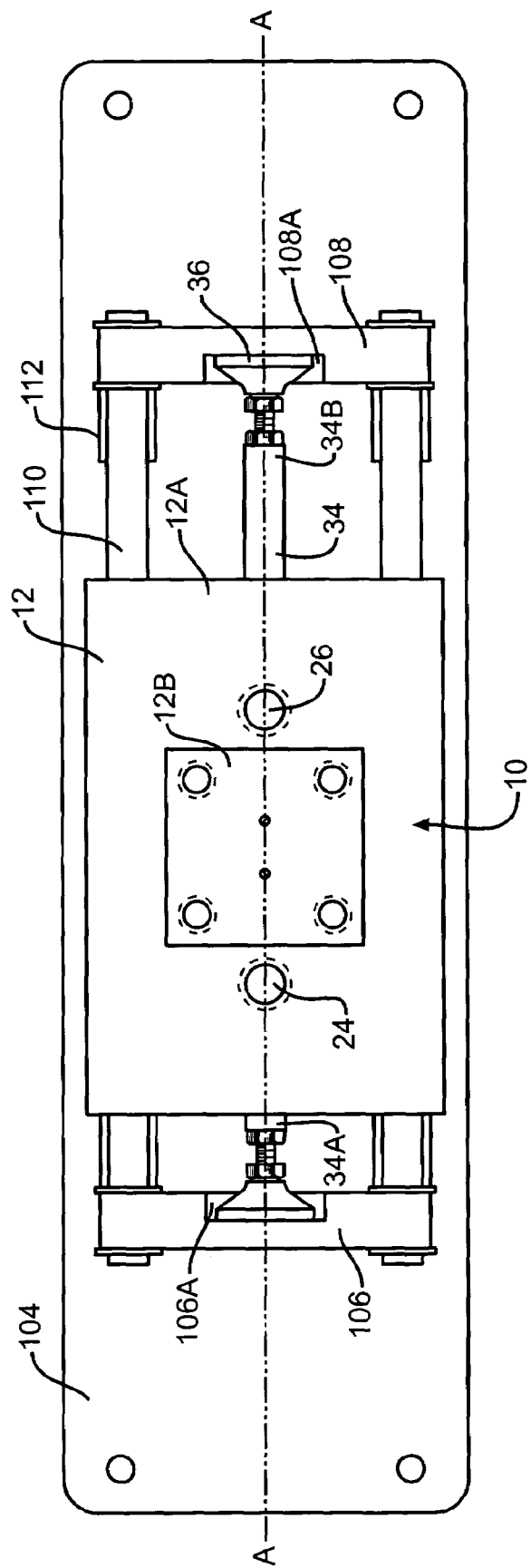
FIG. 4 is a bottom view of the conveyor 100 without the bottom wall 102A and the end walls 102B and 102C of the conveyor housing 102.
Figure 6:
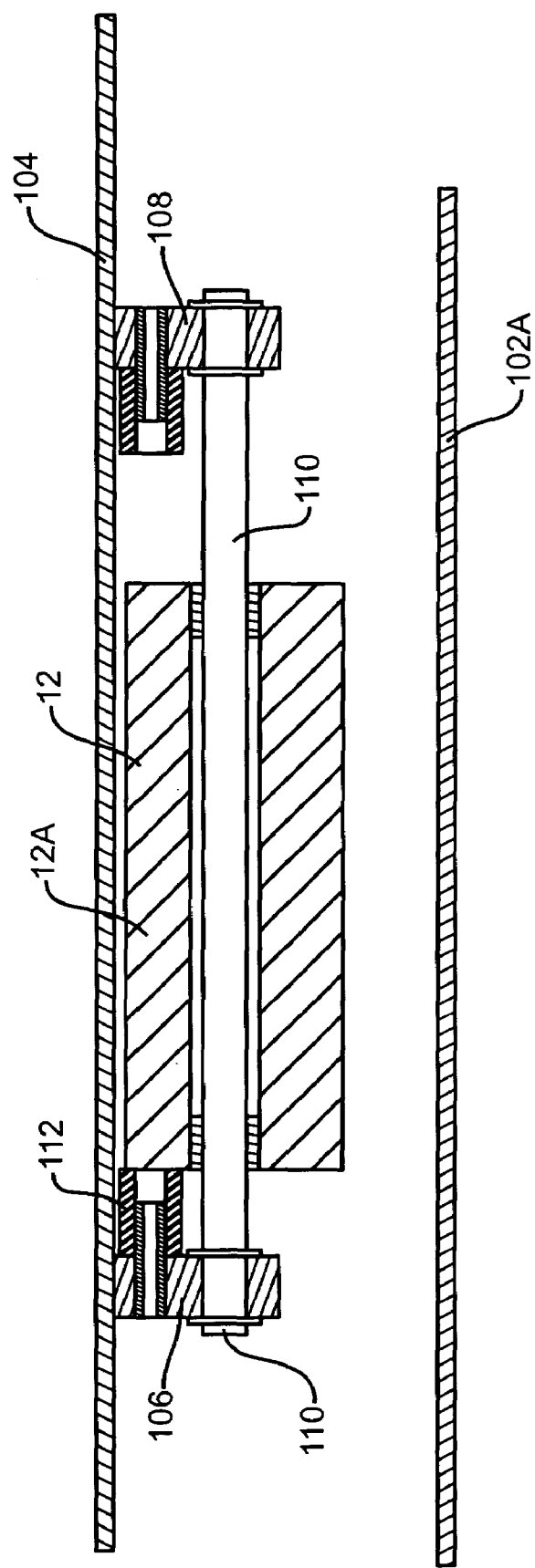
FIG. 6 is a cross-sectional view of FIG. 2 along the line 6—6 showing the guide shaft 110 movably mounted in the motor housing 12.

In one (1) embodiment, the pneumatic motor 10 is used to drive a linear conveyor 100. The linear conveyor 100 includes a conveyor housing 102 with a movable conveyor plate 104. The conveyor housing 102 can have a variety of shapes and sizes. In one (1) embodiment, the conveyor housing 102 has a bottom wall 102A, first and second end walls 102B and 102C and first and second side walls 102D and 102E all forming the inner chamber 102F of the conveyor housing 102 (FIGS. 1 and 2). The conveyor plate 104 is movably positioned on the top edges of the end wall 102B and 102C and side walls 102D and 102E opposite the bottom wall 102A. The conveyor plate 104 is positioned to move along the axis A—A of the conveyor 100 as formed by the end walls 102B and 102C of the conveyor housing 102. The objects (not shown) to be moved by the conveyor 100 are positioned on the conveyor plate 104. In one (1) embodiment, a conveyor tray (not shown) is mounted on the conveyor plate 104 and he objects are positioned in the conveyor tray. First and second blocks 106 and 108 are provided on the bottom side of the conveyor plate 104 adjacent the first and second ends of the conveyor plate 104. When the conveyor plate 104 is positioned on the conveyor housing 102, the blocks 106 and 108 extend into the inner chamber 102F of the housing 102. The pneumatic motor 10 is mounted in the inner chamber 102F of the conveyor housing 102. The motor housing 12 is mounted to the conveyor housing 102. In one (1) embodiment, the motor housing 12 is mounted to the bottom wall 102A and the side walls 102D and 102E of the conveyor housing 102. In this embodiment, the second section 12B of the motor housing 12 is mounted to the bottom wall 102A of the conveyor housing 102 (FIG. 5). The second section 12B of the motor housing 12 is smaller than the first section 12A and acts to space the first section 12A apart from the bottom wall 102A of the conveyor housing 102 thus allowing access through the first section 12A into the cylinder bore 14. The pneumatic motor 10 is positioned in the inner chamber 102F of the conveyor housing 102 so that the axis B—B of the cylinder bore 14 is parallel to the axis A—A of the conveyor 102. The swivel feet 36 on the ends 34A and 34B of the piston rod 34 are in contact with the blocks 106 and 108 of the conveyor plate 104 (FIG. 3). In one (1) embodiment, the inner surface of the blocks 106 and 108 has an indention 106A and 108A into which the swivel feet 36 are positioned. Guide shafts 110 are provided which extend through the first section 12A of the motor housing 12 (FIG. 4). The guide shafts 110 extend essentially parallel to the longitudinal axis B—B of the cylinder bore 14. In one (1) embodiment, the guide shafts 110 are spaced on either side of the cylinder bore 14 adjacent the side walls 102D and 102E of the conveyor housing 102. The guide shafts 110 have a length such as to extend completely through the motor housing 12 and completely through the blocks 106 and 108 of the conveyor plate 104. The guide shafts 110 assist in keeping the blocks 106 and 108 and the conveyor plate 104 aligned with the cylinder bore 14 and the piston rod 34. In one (1) embodiment, the guide shafts 110 are secured to the blocks 106 and 108 so that the guide shafts 110 are able to rotate in the blocks 106 and 108 (FIG. 6). In one (1) embodiment, the openings in the motor housing 12 for the guide shafts 110 are provided with bushings to increase the ease of movement of the guide shafts 110 in the housing 12. Bumpers 112 can also be provided on the inner side of the blocks 106 and 108 adjacent the motor housing 12 to prevent the blocks 106 and 108 from contacting the motor housing 12.

When the pneumatic motor 10 is used for a linear conveyor 100, the movement of the piston rod 34 is used to move the conveyor plate 104. As the piston 38 moves in the second direction in the cylinder bore 14, the second end 34B of the piston rod 34 pushes against the second block 108 of the conveyor plate 104 and moves the conveyor plate 104 in the second direction. As the piston rod 34 reciprocates in the cylinder bore 14, the piston rod 34 may move slightly off center. In one (1) embodiment, wear of the guide shafts 110 causes a change in the position of the blocks 106 and 108. Due to the swivel feet 36, the connection of the blocks 106 and 108 and the piston rod 34 adjusts to minor variations in the positioning of the piston rod 34 or the blocks 106 and 108. The swivel feet 36 allow for constant and continuous contact with the block 106 and 108, regardless of minor variations in the position of the piston rod 34. The ability of the swivel feet 36 to move and adjust on the blocks 106 and 108 allows for small variations and misalignments of the piston rod 34 with respect to the blocks 106 and 108. In addition, the swivel feet 36 prevent the piston rod 34 from jamming in the cylinder bore 14 due to movement of the blocks 106 and 108. The swivel feet 36 also reduce the friction between the piston 38 and the cylinder bore 14 or liner 22 and reduce the friction between the piston rod 34 and the openings 16A in the end plates 16. This reduces wear of the piston 38, piston rod 34, cylinder bore 14 and liner 22.

When the flow of air to the cylinder bore 14 is switched, the first end 34A of the piston rod 34 pushes against the first block 106 to push the conveyor plate 104 in the first direction. In one (1) embodiment where the pneumatic motor 10 is used in a reciprocating linear conveyor 100, a controller 33 located in the air line between the second switch opening 30 and the pneumatic switch 32, retards the flow of air to the pneumatic switch 32 so that there is a pause between the switching of the movement of the conveyor plate 104 from the first direction to the second direction so that the conveyor plate 104 stops and reestablishes connection with the objects on the conveyor plate 104 before moving in the second direction. In one (1) embodiment, where a controller is provided in the air line from the pneumatic switch 32 to the first air port 24, the controller regulates the flow of air into the first air port 24. In this embodiment, the flow of air into the air ports 24 and 26 is controlled so that the rate of flow of air into the first air port 24 is less than the rate of flow of air into the second air port 26. The flow of air into the cylinder bore 14 controls the rate of movement of the piston 38 and the rate of movement of the conveyor plate 104. When the pneumatic motor 10 is used as the driving force for a linear conveyor 100, the flow of air is controlled so that the rate of movement of the conveyor plate 104 in the second direction is slower than the rate of movement of the conveyor plate 104 in the first direction.

It is intended that the foregoing description be only illustrative of the present invention and that the present invention be limited only by the hereinafter appended claims.

I claim:

1. A pneumatic motor for use in a conveyor for moving objects on a conveyor plate, the motor which comprises:
    (a) a housing;
    (b) a cylinder bore having opposed ends and located in the housing and having an oil impregnated liner positioned in the cylinder bore between the ends of the cylinder bore;
    (c) a piston rod having opposed ends and movably mounted in the cylinder bore so that the ends of the piston rod extend out of the ends of the cylinder bore wherein the ends of the piston rod are connected to the conveyor plate; and
    (d) a piston having opposed ends and mounted on the piston rod in the cylinder bore spaced between the ends of the piston rod and the ends of the cylinder bore, wherein air flows into the cylinder bore adjacent one end of the piston to move the piston, the piston rod and the conveyor plate in a first direction and wherein when the piston moves a predetermined distance in the cylinder bore, air flows into the cylinder bore adjacent the other end of the piston to move the piston, piston rod and conveyor plate in a second direction opposite to the first direction.

2. The pneumatic motor of claim 1 wherein the liner extends around a complete circumference of the cylinder bore and at least along a portion of a length of the cylindrical bore between the ends of the cylindrical bore.

3. The pneumatic motor of claim 1 wherein the liner is constructed of bronze.

4. The pneumatic motor of claim 1 wherein the piston rod extends through a center bore of the piston and wherein the piston is mounted on the piston rod so that the piston is able to rotate on the piston rod.

5. The pneumatic motor of claim 4 wherein the piston is fixed along a length of the piston rod.

6. The pneumatic motor of claim 1 wherein the ends of the cylinder bore have end plates with openings through which the piston rod extends and wherein the openings have seals which are oil impregnated to lubricate the piston rod and seal the piston rod in the end plates.

7. The pneumatic motor of claim 6 wherein the end plates in the ends of the cylinder bore are removable.

8. The pneumatic motor of claim 1 wherein the piston has seals between the ends which contact the cylinder bore to provide a seal between the piston and the cylinder bore.

9. The pneumatic motor of claim 1 wherein the cylinder bore has first and second openings connected to a pneumatic switch, wherein when the piston has moved the predetermined distance in the cylinder bore in the second direction, the piston moves past the first opening so that the first opening is in fluid communication with the air in the cylinder bore adjacent the first end of the piston which activates the pneumatic switch to stop the flow of air into the cylinder bore adjacent the first end of the piston and start the flow of air to the cylinder bore adjacent the second end of the piston to move the piston in the first direction and wherein when the piston has moved a predetermined distance in the cylinder bore in the first direction, the piston moves past the second opening so that the second opening is in fluid communication with the air in the cylinder bore adjacent the second end of the piston which activates the pneumatic switch to stop the flow of air into the cylinder bore adjacent the second end of the piston and start the flow of air into the cylinder bore adjacent the first end of the piston to move the piston in the second direction.

10. The pneumatic motor of claim 9 wherein a controller regulates a rate of air to the pneumatic switch to delay the flow of air to the cylinder bore adjacent the first side of the piston so that before the piston switches from moving in the first direction to moving in the second direction, the piston stops moving which stops the movement of the piston rod and the conveyor plate.

11. The pneumatic motor of claim 9 wherein a controller regulates a rate of flow of air to the pneumatic switch so that a rate of movement of the piston and the first direction is greater than a rate of movement of the piston in the second direction.

12. The pneumatic motor of claim 1 wherein the cylinder bore has a first air port adjacent the first end and a second air port adjacent the second end, wherein air flows into the cylinder bore through the first air port to move the piston in the second direction and air flows into the cylinder bore through the second air port to move the piston in the first direction, wherein when the piston is moving in the second direction, air in the cylinder bore adjacent the second end of the piston is exhausted through the second air port and wherein when the piston is moving in the first direction, air in the cylinder bore adjacent the first end of the piston is exhausted through the first air port.

13. A pneumatic motor for providing linear motion in opposed directions, which comprises:
    (a) a cylinder bore having opposed ends with a liner spaced between the ends wherein the liner is oil impregnated;
    (b) a piston rod having opposed ends and extending through the cylinder bore, the piston rod having a length between the ends greater than a length of the cylinder bore between the ends so that the piston rod extends outward beyond each end of the cylinder bore; and (c) a piston having a first end and a second end and mounted on the piston rod in the cylinder bore adjacent the liner wherein air is moved into the cylinder bore adjacent the first end of the piston and moves the piston in a second direction, wherein when the piston has moved a predetermined distance in the cylinder bore, air is moved into the cylinder bore adjacent the second end of the piston to move the piston in a first direction opposite the second direction.

14. The pneumatic motor of claim 13 wherein the liner extends around a complete circumference of the cylinder bore and at least along a portion of a length of the cylindrical bore between the ends of the cylindrical bore.

15. The pneumatic motor of claim 13 wherein the piston rod extends through a center bore of the piston and wherein the piston is mounted on the piston rod so that the piston is able to rotate on the piston rod.

16. The pneumatic motor of claim 13 wherein the cylinder bore has first and second openings connected to a pneumatic switch, wherein when the piston has moved the predetermined distance in the cylinder bore in the second direction, the piston moves past the first opening so that the first opening is in fluid communication with the air in the cylinder bore adjacent the first end of the piston which activates the pneumatic switch to stop the flow of air into the cylinder bore adjacent the first end of the piston and start the flow of air to the cylinder bore adjacent the second end of the piston to move the piston in the first direction and wherein when the piston has moved a predetermined distance in the cylinder bore in the first direction, the piston moves past the second opening so that the second opening is in fluid communication with the air in the cylinder bore adjacent the second end of the piston which activates the pneumatic switch to stop the flow of air into the cylinder bore adjacent the second end of the piston and start the flow of air into the cylinder bore adjacent the first end of the piston to move the piston in the second direction.

17. The pneumatic motor of claim 13 wherein the cylinder bore has a first air port adjacent the first end and a second air port adjacent the second end, wherein air flows into the cylinder bore through the first air port to move the piston in the second direction and air flows into the cylinder bore through the second air port to move the piston in the first direction, wherein when the piston is moving in the second direction, air in the cylinder bore adjacent the second end of the piston is exhausted through the second air port and wherein when the piston is moving in the first direction, air in the cylinder bore adjacent the first end of the piston is exhausted through the first air port.

18. A conveyor for moving objects on a conveyor plate, which comprises:

(a) a fluid actuated motor which includes a housing having a cylinder bore with opposed ends forming a longitudinal axis of the cylinder bore, an oil impregnated liner extending along at least a portion of the cylinder bore, a piston rod having opposed ends and movably mounted in the cylinder bore wherein each of the ends of the piston rod extends beyond the ends of the cylinder bore and is connected to the conveyor plate, and a piston having opposed ends and mounted on the piston rod between the ends of the piston rod in the cylinder bore wherein fluid enters the cylinder bore adjacent one end of the piston to move the piston, piston rod and conveyor plate in a first direction and wherein when the piston reaches a predetermined position in the cylinder bore, fluid enters the cylinder bore adjacent the other end of the piston to move the piston, piston rod and conveyor plate in a second direction opposite from the first direction and wherein the liner provides lubrication during movement of the piston in the cylinder bore and provides a seal between the piston and the cylinder bore.

19. The conveyor of claim 18 wherein the liner extends completely around a circumference of the cylinder bore and along at least a portion of a length of the cylinder bore between the ends.

20. The conveyor of claim 18 wherein a swivel foot is mounted on each of the ends of the piston rod, wherein the swivel foot is connected to the conveyor plate to move the conveyor plate and wherein the connection of the swivel foot to the conveyor plate is adjustable to allow for variation in a position of the piston rod.

21. The conveyor of claim 20 wherein guide shafts having opposed ends extend through the housing of the motor parallel to the longitudinal axis of the cylinder bore, wherein the opposed ends of the guide shafts are connected to blocks which are connected to the conveyor plate and wherein the swivel foot contacts the block between the guide shafts to move the conveyor plate.

22. The conveyor of claim 18 wherein guide shafts having opposed ends extend through the housing of the motor parallel to the longitudinal axis of the cylinder bore and wherein the opposed ends of the guide shafts are connected to blocks which are connected to the conveyor plate.

23. The conveyor of claim 22 wherein the guide shafts are rotatably mounted to the blocks.

24. The conveyor of claim 18 wherein the cylindrical bore has first and second openings connected to a pneumatic switch, wherein when the piston moves in the second direction to the predetermined position past the first opening, the first opening is in fluid communication with the air in the cylinder bore which activates the switch to stop the flow of air into the cylindrical bore adjacent the first end of the piston and to start the flow of air into the cylindrical bore adjacent the second end of the piston which moves the piston in the first direction and wherein when the piston moves in the first direction to a second predetermined position past the second opening, the second opening is in fluid communication with the air in the cylinder bore which activates the switch to stop the flow of air into the center bore adjacent the second end of the piston and to start the flow of air into the cylindrical bore adjacent the first end of the piston to change a direction of movement of the piston.

25. The conveyor of claim 24 wherein a controller allows for air to flow into the cylinder bore adjacent the second end of the piston at a rate of flow greater than a rate of flow of air into the cylinder bore adjacent the first end of the piston so that the conveyor plate moves in the second direction at a rate of movement slower than a rate of movement of the conveyor plate in the first direction.

* * * * *

UNITED STATES PATENT AND TRADEMARK OFFICE
CERTIFICATE OF CORRECTION

| | | |
|---|---|---|
| PATENT NO. | : 7,225,725 B2 | Page 1 of 1 |
| APPLICATION NO. | : 11/130474 | |
| DATED | : June 5, 2007 | |
| INVENTOR(S) | : Dennis A. Trestain | |

It is certified that error appears in the above-identified patent and that said Letters Patent is hereby corrected as shown below:

Column 5, Line 16 - after "is" delete "circumference".

Column 10, line 38;
Claim 10, Line 2 - after "rate" insert -- of flow --.

Column 10, line 46;
Claim 11, Line 3 - "and" should be changed to -- in --.

Signed and Sealed this

Seventh Day of August, 2007

JON W. DUDAS
*Director of the United States Patent and Trademark Office*